US009970226B2

(12) United States Patent
Stewart et al.

(10) Patent No.: US 9,970,226 B2
(45) Date of Patent: May 15, 2018

(54) VEHICLE WINDOW ASSEMBLY

(71) Applicant: GM GLOBAL TECHNOLOGY OPERATIONS LLC, Detroit, MI (US)

(72) Inventors: Patrick N. Stewart, Macomb, MI (US); Terrence P. Costigan, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/286,003

(22) Filed: Oct. 5, 2016

(65) Prior Publication Data
US 2018/0094468 A1 Apr. 5, 2018

(51) Int. Cl.
*B60J 1/16* (2006.01)
*E05D 15/16* (2006.01)
*E05F 15/689* (2015.01)
*B60J 1/00* (2006.01)
*B60J 1/17* (2006.01)

(52) U.S. Cl.
CPC ............ *E05D 15/165* (2013.01); *B60J 1/006* (2013.01); *B60J 1/17* (2013.01); *E05F 15/689* (2015.01); *E05Y 2201/434* (2013.01); *E05Y 2201/684* (2013.01); *E05Y 2600/50* (2013.01); *E05Y 2900/531* (2013.01); *E05Y 2900/55* (2013.01)

(58) Field of Classification Search
CPC . E05D 15/165; B60J 1/17; B60J 1/006; E05F 15/689; E05Y 2900/55
USPC ................................... 49/374, 375
See application file for complete search history.

(56) References Cited

U.S. PATENT DOCUMENTS

| 4,762,904 | A | * | 8/1988 | Nakama | B60J 1/17 428/122 |
| 4,848,032 | A | * | 7/1989 | Ballor | B60J 1/17 49/350 |
| 4,987,699 | A | * | 1/1991 | Gold | B60J 1/17 156/107 |
| 5,513,468 | A | * | 5/1996 | Diestelmeier | E05F 11/385 49/351 |
| 5,546,704 | A | * | 8/1996 | Maruoka | B60J 1/17 49/375 |
| 5,765,310 | A | * | 6/1998 | Gold | B60J 1/17 49/375 |
| 5,966,872 | A | * | 10/1999 | Wasek | E05F 11/385 49/348 |
| 6,349,504 | B1 | * | 2/2002 | Schmitt | E05F 11/385 49/375 |

(Continued)

*Primary Examiner* — Jerry E Redman
(74) *Attorney, Agent, or Firm* — Quinn IP Law

(57) ABSTRACT

A window assembly is disclosed for a vehicle having a window regulator rail and a window carrier configured to shift along the window regulator rail. The window assembly includes a glass panel having a mounting end and a clip assembly fixed to the mounting end of the glass panel. The clip assembly is configured to be fixed to the window carrier and includes a clip body defined by a first end configured to engage the window carrier and an opposing second end defining a channel. The clip assembly also includes a retainer arranged in the channel and configured to accept and position the glass panel mounting end inside the channel. The clip assembly additionally includes an adhesive configured to fill the channel and cure therein after the mounting end of the glass panel has been positioned inside the channel. A vehicle door having such a window assembly is also disclosed.

20 Claims, 4 Drawing Sheets

(56) References Cited

U.S. PATENT DOCUMENTS

| | | | | |
|---|---|---|---|---|
| 6,460,296 | B1* | 10/2002 | Arquevaux | E05F 11/382 |
| | | | | 411/119 |
| 6,497,025 | B1* | 12/2002 | Bohannan | B60J 1/17 |
| | | | | 269/296 |
| 6,598,345 | B1* | 7/2003 | Arimoto | E05F 11/385 |
| | | | | 49/352 |
| 8,171,682 | B2* | 5/2012 | Pulcini | E05F 11/385 |
| | | | | 52/204.5 |
| 8,943,750 | B2* | 2/2015 | Twork, Jr. | E05F 11/385 |
| | | | | 49/352 |
| 2002/0073622 | A1* | 6/2002 | Davis | E05F 11/385 |
| | | | | 49/349 |
| 2003/0093960 | A1* | 5/2003 | Mizusawa | E05F 11/385 |
| | | | | 52/204.62 |
| 2003/0196384 | A1* | 10/2003 | Kang | B60J 1/17 |
| | | | | 49/375 |
| 2006/0260200 | A1* | 11/2006 | Bigourden | E05F 11/385 |
| | | | | 49/374 |

* cited by examiner

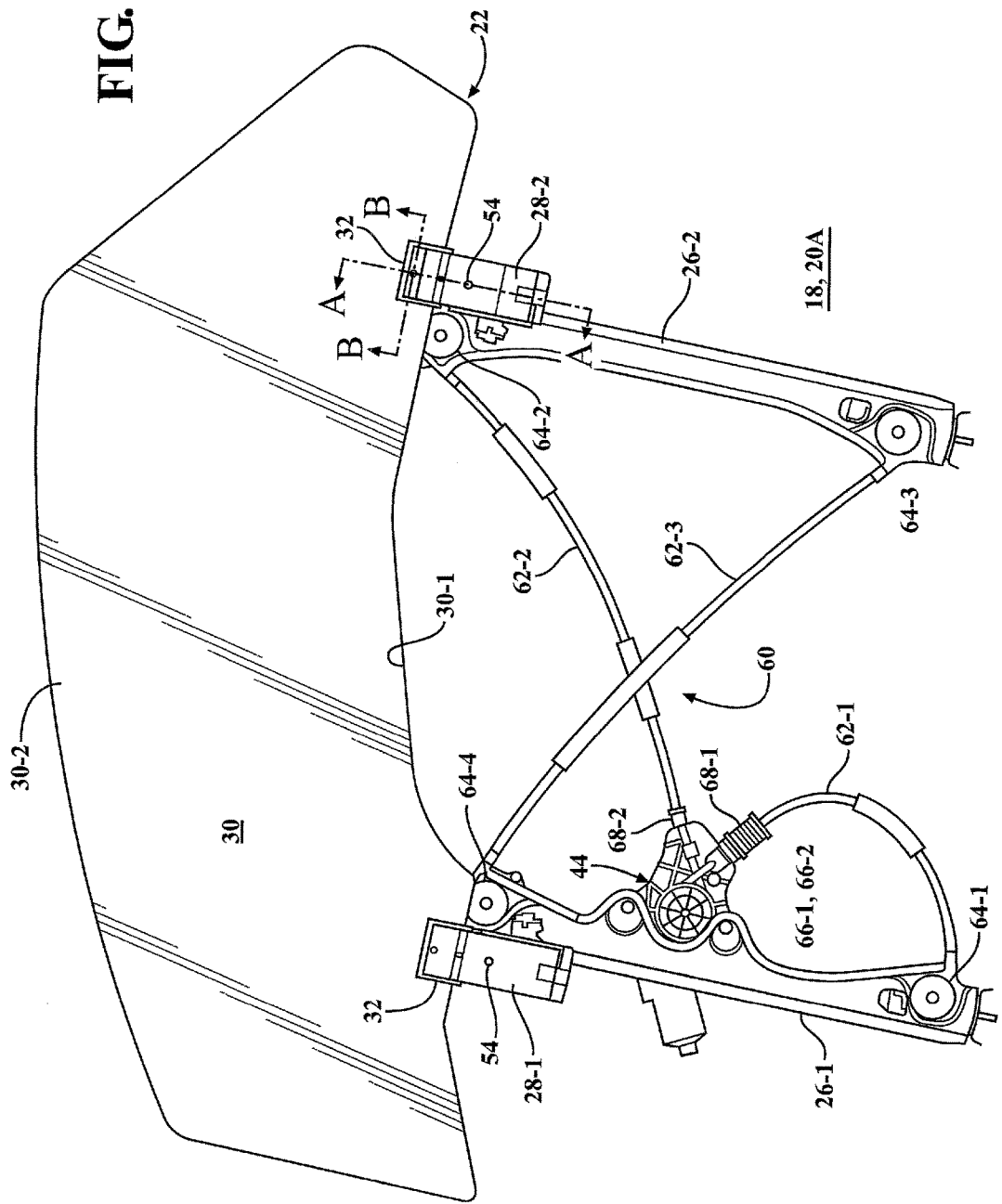

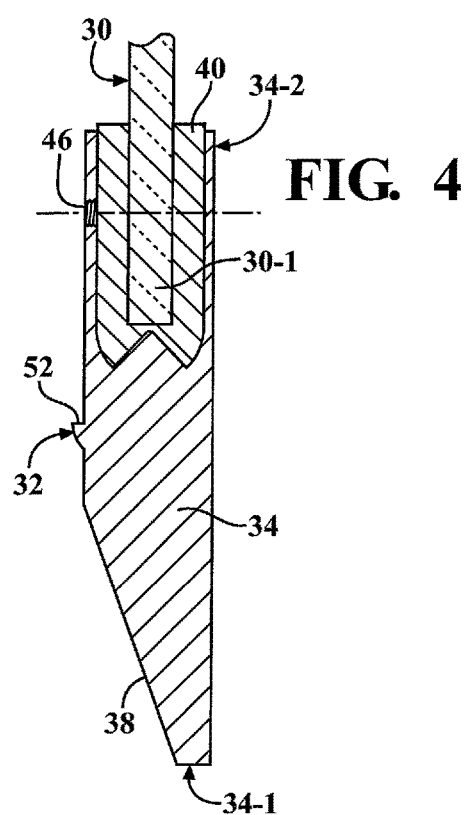
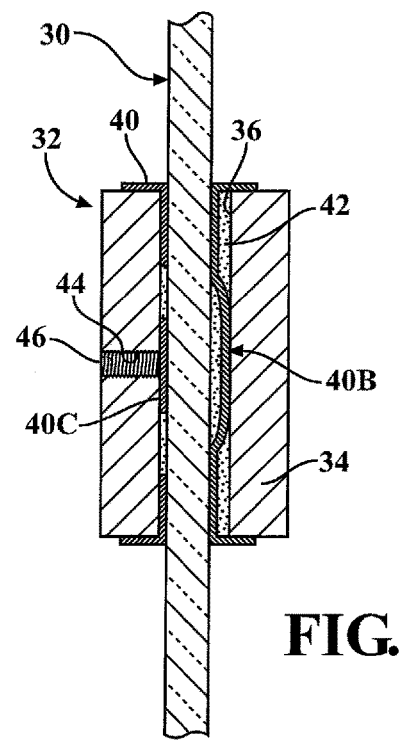
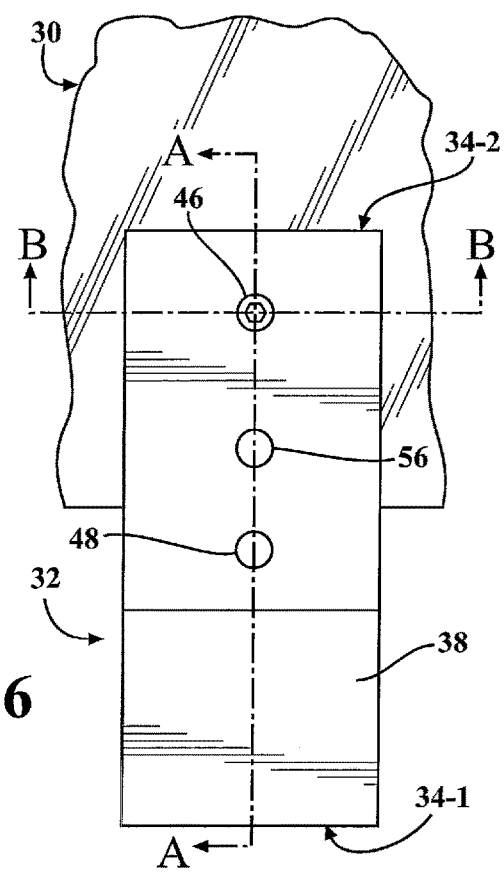

VEHICLE WINDOW ASSEMBLY

INTRODUCTION

The present disclosure relates to a window assembly and mounting thereof in a vehicle.

A typical vehicle has at least one window to permit passage of light into an interior of the vehicle. Such a window may be covered with a moveable glass panel to permit, for example, entry of ambient air into the vehicle interior. Generally, such a vehicle also employs at least one door for access to the vehicle interior. A vehicle access door may also include a moveable window glass panel, such as above.

Some vehicle doors include a window frame for the respective moveable window glass panel. Such a frame serves to guide the window glass panel into its up position and typically includes a seal for acoustic and weather insulation. Other vehicles use doors without a window frame to guide the moveable window glass panel. In such designs, the window glass panel is guided primarily by the door's bottom structure, while the acoustic and weather insulation in the window up position is provided by other means, such as the vehicle pillars and/or the roof.

SUMMARY

A window assembly is disclosed for a vehicle having a window regulator rail and a window carrier configured to shift along the window regulator rail. The window assembly is configured to be selectively shifted with the window carrier along the window regulator rail and includes a glass panel having a mounting end and a clip assembly fixed to the mounting end of the glass panel. The clip assembly is configured to be fixed to the window carrier and includes a clip body defined by a first end configured to engage the window carrier and an opposing second end defining a channel. The clip assembly also includes a retainer arranged in the channel and configured to accept and position the mounting end of the glass panel inside the channel. The clip assembly additionally includes an adhesive configured to fill the channel and cure therein after the mounting end of the glass panel has been positioned inside the channel.

The first end of the clip body may define a tapered surface configured to engage the window carrier.

The clip body may define a snap-in feature configured to fix the clip assembly to the window carrier after the tapered surface has engaged the window carrier.

The vehicle may additionally have a window regulator operatively connected to the window carrier and configured to selectively shift the window assembly along the window regulator rail. The window regulator may be configured as an electric motor or a mechanical linkage. Also, the window regulator may be operatively connected to the window carrier via a cable.

The clip body may define a first aperture arranged to accept a first fastener, such as a set-screw, configured to fix the glass panel to the clip body prior to the adhesive having filled the channel and cured therein.

The clip body may define a second aperture arranged to accept a second fastener that is configured to fix the clip body to the window carrier.

The first end of the clip body may define a third aperture arranged to receive the adhesive and direct the adhesive into the channel.

The retainer may include a spring element configured to preload the mounting end of the glass panel inside the channel prior to the adhesive having filled the channel and cured therein.

The spring element may be a leaf spring integrally formed with the retainer.

The first fastener may be configured to press on the retainer to compress the spring element inside the channel and position the mounting end of the glass panel inside the channel.

A vehicle door having such a window assembly is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 3 is a schematic plan view of the moveable window assembly, as shown in FIGS. 1 and 2, having a glass panel mounted to window regulator rails via window carriers having individual clip assemblies.

FIG. 4 is a schematic cross-sectioned side view A-A of a single clip assembly having a retainer arranged in a body of the clip and the glass panel (shown in FIG. 3) inserted into the clip assembly according to one embodiment of the disclosure.

FIG. 5 is a schematic cross-sectioned rear view B-B of the clip assembly shown in FIG. 4, depicting a channel in the clip body, the retainer arranged in the channel and having a perforated structure and a spring element positioning the glass panel inside the channel according to the disclosure.

FIG. 6 is a schematic top view of the clip assembly shown in FIG. 3, having optional construction according to the disclosure.

DETAILED DESCRIPTION

Figure 1:
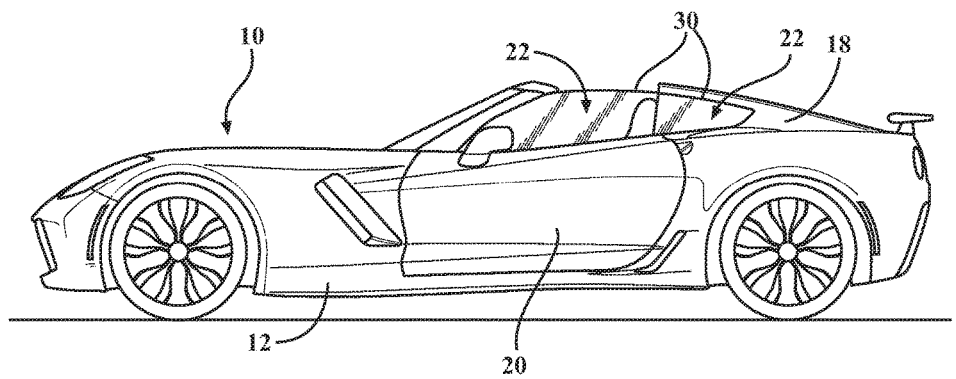
FIG. 1 is a side view of a vehicle having moveable window assemblies in fully lifted positions.
Figure 2:
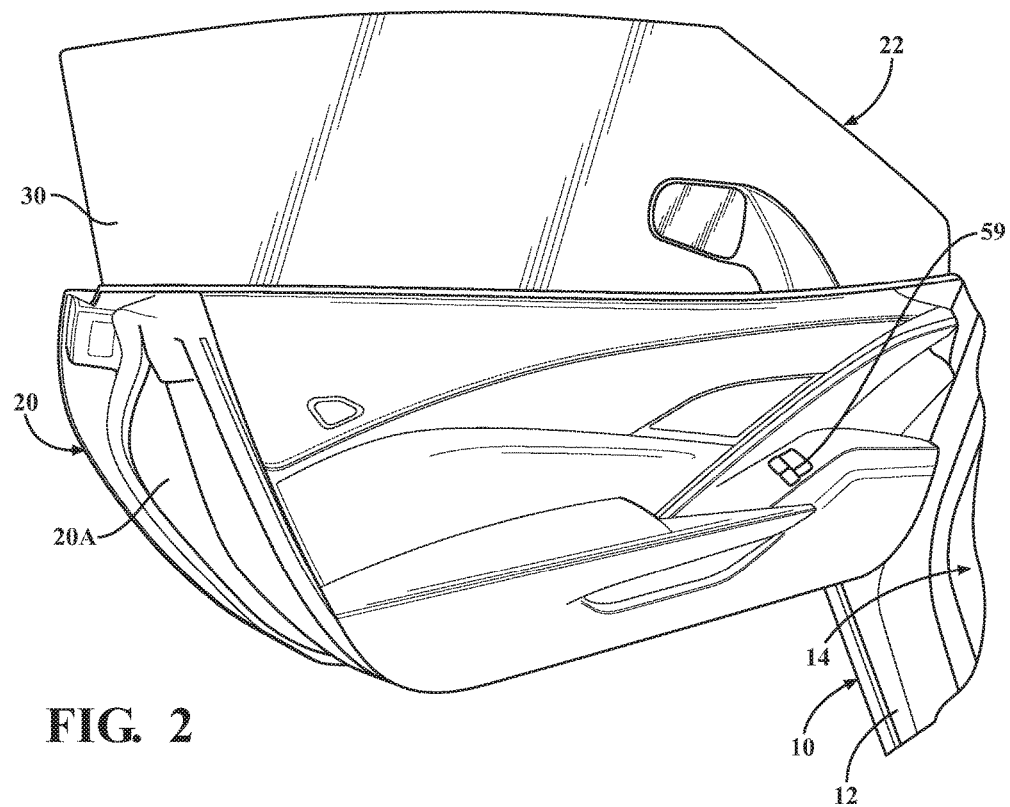
FIG. 2 is a partial perspective view of the vehicle shown in FIG. 1, illustrating a vehicle access door in an open state providing access to a vehicle interior and having the moveable window assembly in a partially lowered position.

Referring to the drawings, wherein like reference numbers refer to like components, FIGS. 1 and 2 show a vehicle 10 having a vehicle body 12 defining a vehicle interior 14. The vehicle body 12 defines a window opening 16 into the vehicle interior 14, which may be arranged in a fixed vehicle body panel 18 or in an access door 20. Although not shown, as understood by those skilled in the art, the access door 20 may be selectively opened and closed, for example, by being swung on hinges or slid along a track.

As indicated in FIG. 2, the access door 20 includes a door structure 20A, including an inner structure, configured to provide the door with toughness and durability. While only a single representative access door 20 is shown in FIGS. 1 and 2, it is to be understood that the vehicle 10 may have as many doors 20, arranged in any position on the vehicle, as dictated by the specific vehicle design. Additionally, although the representative door 20 is shown in FIGS. 1 and 2 as a vehicle side door, the door 20 may also be configured as a tailgate (not shown, but known to those skilled in the art) or other type of a door for access into the vehicle 10.

As additionally shown in FIGS. 1 and 2, the vehicle 10 also includes at least one window assembly 22 configured to be selectively shifted relative to the vehicle body 12. The window assembly 22 may be mounted to the vehicle body 12 at the window opening 16, either to the fixed vehicle body panel 18 (shown in FIG. 1) or to the access door 20 (shown in FIGS. 1 and 2). As shown in FIG. 3, the vehicle 10 also includes window regulator rails 26-1, 26-2 and window carriers 28-1, 28-2. The window regulator rails 26-1, 26-2 may be mounted to the door structure 20A. As shown, the window carrier 28-1 is operatively connected to and configured to shift along, such as slide on, the respective window regulator rail 26-1. Similarly, the window carrier 28-2 is operatively connected to and configured to shift along the respective window regulator rail 26-2. The window assembly 22 is configured to be mounted to and selectively shifted with the window carriers 28-1, 28-2 along the respective window regulator rails 26-1, 26-2. As shown, each window assembly 22 includes a glass panel 30 having a mounting end 30-1 and a free end 30-2.

The glass panel 30 may have either a tempered or a laminated structure. Tempered glass is a type of glass processed by controlled thermal or chemical treatments to increase its strength compared with typical annealed or plate glass. Tempering puts the outer surfaces into compression and the inner surfaces into tension. Such stresses cause the glass, when broken, to crumble into small granular pieces instead of splintering into sharp fragments. Laminated glass is a type of glass that holds together when broken. In the event of breaking, the glass is held in place by an interlayer, typically of polyvinyl butyral (PVB) or ethylene-vinyl acetate (EVA), between two or more layers of glass. The interlayer keeps the glass layers bonded even when broken, and its high strength prevents the glass from breaking up into large sharp fragments. An impact on the laminated glass produces a characteristic "spider web" cracking pattern when the impact is not enough to completely pierce the glass.

Laminated glass may also be used to increase the sound insulation effect of a window, where it significantly improves sound attenuation compared to unlaminated glass panes of the same thickness. For such sound insulation purpose, a special "acoustic PVB" compound may be used for the interlayer. In the case of the EVA material, no additional acoustic material is required, since the EVA itself is an effective sound insulator. Laminated glass using PVB or EVA interlayer is also effective in blocking most ultra-violet radiation. While laminated glass has particular advantages over tempered glass, the laminated glass is more sensitive to stresses, which may be induced by the glass panel's own weight, for example, in a case of panel and/or panel support structure misalignment.

In the embodiment where the window assembly 22 is mounted to the access door 20, the door structure 20A may be characterized by an absence of an upper door frame, specifically front and rear support pillars, as well as their connecting "header" section, for guiding the free end 30-2 of the glass panel 30. In such an embodiment, when the door 20 is closed, the glass panel 30 is supported by the nearby vehicle body 12 structure, such as body pillar(s) and/or the roof. On the other hand, when the door 20 in such an embodiment is open, the weight and any misalignment of the glass panel 30 relative to the door would be carried primarily by the mounting end 30-1. The window assembly 22 also includes clip assemblies 32. As shown in FIG. 3, each clip assembly 32 is fixed to the mounting end 30-1 of the glass panel 30 as will be described in detail below. Each clip assembly 32 is also configured to be connected and thereby fixed to the window carrier 28 in order to facilitate the selective shifting of the window assembly 22 along the window regulator rails 26. The clip assemblies 32, as shown in FIGS. 3-7, also support the glass panel 30 weight when the door 20 is open.

As shown in FIG. 4, the clip assembly 32 has a clip body 34 defined by a first end 34-1 configured to engage a respective window carrier 28-1 or 28-2 and an opposing second end 34-2 defining a channel 36. The first end 34-1 of the clip body 34 defines a tapered surface 38 configured to engage the window carrier 28-1 or 28-2. The clip body 34 may be constructed from a rigid and durable material, such as metal, for example, aluminum. The clip assembly 32 includes a retainer 40 arranged in the channel 36. The retainer 40 is configured to accept and position the mounting end 30-1 of the glass panel 30 inside the channel 36. The retainer 40 may be constructed from a flexible or elastic material, for example a moldable plastic. The retainer 40 may define a chamfered or rounded leading surface (not shown) configured to facilitate insertion of the retainer into the channel 36. The retainer 40 may be molded in a single plane P and bent or folded into shape for insertion into the channel 36. Alternatively, the retainer 40 may be molded in a final, folded shape for insertion into the channel 36.

Figure 7:
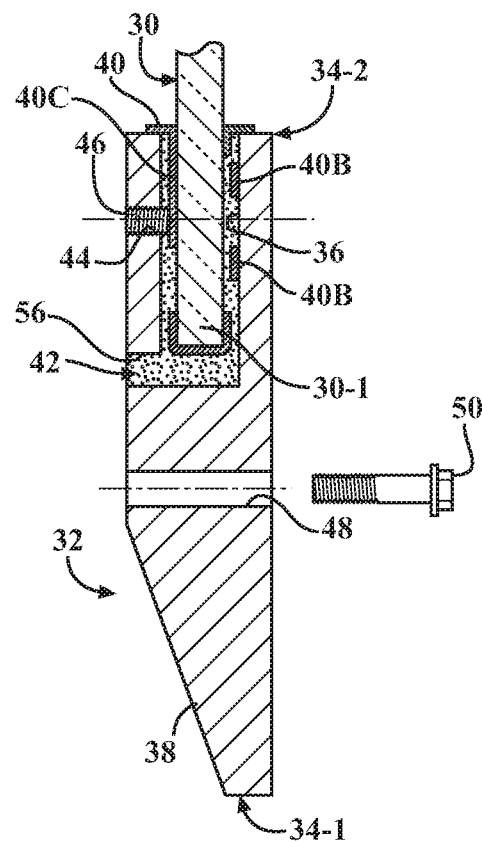
FIG. 7 is a schematic cross-sectional side view A-A of the clip assembly shown in FIG. 6 according to of the disclosure.

As shown in FIG. 7 taken along section A-A shown in FIG. 6) illustrating a cross-sectioned side view of the clip assembly 32, the clip assembly also includes an adhesive 42 (also shown in FIG. 5 and taken along section B-B shown in FIG. 6), such as epoxy or resin, configured to fill the channel 36. The adhesive 42 is intended to be introduced into the channel 36 and cure therein after the mounting end 30-1 of the glass panel 30 has been positioned and aligned inside the channel. As shown in each of FIGS. 5 and 7, the retainer 40 is perforated and also includes a spring element 40B configured to preload, i.e., maintain a position of, the mounting end 30-1 of the glass panel 30 inside the channel 36 prior to the adhesive 42 having penetrated the perforated retainer, filled the channel 36, and cured therein. As shown in FIGS. 5 and 7, the spring element 40B may be one or more leaf springs formed integrally with the retainer 40. As shown, the clip body 34 defines a first aperture 44 arranged to accept a first fastener 46, such as a set-screw, configured to fix the glass panel 30 to the clip body 34 prior to the adhesive 42 having filled the channel 36 and cured therein. The first fastener 46 is configured to press on a section 40C (shown in FIGS. 5 and 7) of the retainer 40 to compress the spring element(s) 40B inside the channel 36 and position, such as align and center, the mounting end 30-1 of the glass panel 30 prior to the adhesive 42 having been introduced into the channel 36.

As shown in FIGS. 6 and 7, the clip body 34 may define a second aperture 48 arranged to accept a second fastener 50 configured to fix the clip body to the window carrier 28-1 or 28-2 after the tapered surface 38 has engaged the respective window carrier. As an alternative to the second aperture 48 with the second fastener 50, the clip body 34 may define a snap-in feature 52 (shown in FIG. 4), such as a projection, configured to engage an aperture or a blind hole 54 to thereby fix the clip assembly 32 to the window carrier 28-1 or 28-2 after the engagement of the tapered surface 38 with the particular window carrier. The first end 34-1 of the clip body 34 may also define a third aperture 56 arranged to receive the adhesive 42 and direct the adhesive into the channel 36.

With resumed reference to FIG. 3, the vehicle 10 additionally includes a window regulator 58 operatively connected to the window carriers 28-1, 28-2 via a system of cables and pulleys 60. The window regulator 58 is configured to selectively shift the window assembly 22 along the window regulator rails 26-1, 26-2. The window regulator 58 may be configured as an electric motor controlled via a switch 59 (shown in FIG. 2) operable by an occupant of the vehicle 10, or a mechanical linkage coupled to a lever configured to be operated manually (not shown, but understood by those skilled in the art). As shown, the system of cables and pulleys 60 includes first, second, and third cables, 62-1, 62-2, and 62-3, respectively. The first cable 62-1 is guided by a first pulley 64-1 along the rail 26-1 and operatively connects the window regulator 58 to the window carrier 28-1. The second cable 62-2 is guided by a second pulley 64-2 along the rail 26-2 and operatively connects the window regulator to the window carrier 28-2. The third cable 62-3 is guided by a third pulley 64-3 and a fourth pulley 64-4 between the rails 26-1 and 26-2, and operatively connects the window carrier 28-1 to the window carrier 28-2.

The window regulator 58 includes oppositely acting first and second spools 66-1, 66-2, respectively. The first spool 66-1 is configured to wind the first cable 62-1 counter clock-wise to shift the window carrier 28-1 in a downward direction, and configured to unwind the first cable clock-wise to shift the window carrier 28-2 in an upward direction. Simultaneously with the counter clock-wise action of the first spool 66-1, the second spool 66-2 rotates counter clock-wise to unwind the second cable 62-2 and thereby shift the window carrier 28-2 in a downward direction. On the other hand, when the first spool 66-1 unwinds the first cable 62-1 clock-wise, the second spool 66-2 rotates clock-wise to wind the second cable 62-2 and thereby shift the window carrier 28-2 in an upward direction.

Accordingly, the window assembly 22 is operatively connected to the window regulator 58 via the window carriers 28-1, 28-2 for being selectively shifted by the window regulator along the window regulator rails 26-1, 26-2. As a result of the above interconnections provided by the system of cables and pulleys 60, when the window regulator 58 operates in either the clock-wise or the counter clock-wise direction, each of the window carriers 28-1 and 28-2 shift in the same direction, thereby, together, either lifting or lowering the window assembly 22. Such a simultaneous shifting of the window carriers 28-1 and 28-2 minimizes misalignment of the window assembly 22 relative to the window regulator rails 26-1, 26-2 and also reduces stress on the glass panel 30 caused by such misalignment. Additionally, the first cable 62-1 includes a first spring 68-1, while the second cable 62-2 includes a second spring 68-2. Each of the spring elements 68-1, 68-2 is configured to absorb shock and take up slack in the respective cable 62-1, 62-2 at start-up of the window regulator 58 to further reduce stress on the glass panel 30.

Overall, the disclosed clip assembly 32 is particularly advantageous in facilitating precise alignment of the glass panel 30 in the window assembly 22 and providing appropriately dampened support for the glass panel in the vehicle 10. Such alignment and dampened support is particularly beneficial for the glass panel 30 constructed from the more stress-sensitive laminated glass. Furthermore, the precise alignment and dampened support may be especially beneficial when the laminated glass panel 30 is mounted to the door structure 20A that is characterized by an absence of a frame for guiding the free end 30-2 of the glass panel 30, such that the weight of the glass and any misalignment would be carried primarily by the mounting end 30-1. Furthermore, by using appropriate manufacturing fixture(s) to preset and fix position of the glass panel 30 along with the retainer 40 inside the channel 36 of the clip assembly 32 prior to tightening of the first fastener 46 and introduction of the adhesive 42, the window assembly 22 may be generated with acceptable manufacturing process capability and without requiring post-assembly rework.

Figure 8:
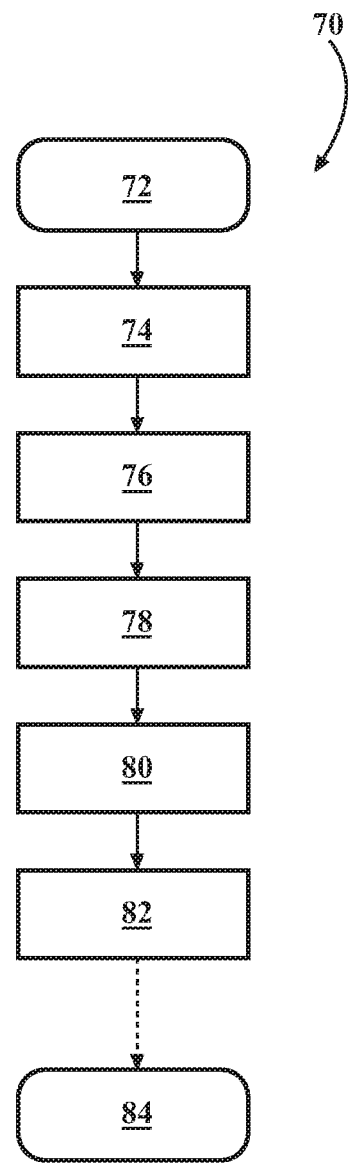
FIG. 8 is a flow diagram of a method of generating the window assembly for the vehicle shown in FIGS. 1 and 2.

FIG. 8 depicts a method 70 of generating the window assembly 22 for the vehicle 10, as described above with respect to FIGS. 1-7. The method initiates in frame 72, where it includes providing the glass panel 30 having the mounting end 30-1. After frame 72, the method advances to frame 74 where the method includes providing the clip assembly 32 having the clip body 34 defined by the first end 34-1 configured to engage the window carrier 28-1 or 28-2 and the opposing second end 34-2 defining the channel 36. Following frame 74, the method proceeds to frame 76 where the method includes arranging the retainer 40 inside the channel 36. After frame 76, the method proceeds to frame 78 and includes positioning the mounting end 30-1 of the glass panel 30 inside the channel 36.

Following frame 78, the method advances to frame 80 where it eventually includes filling the channel 36 with the adhesive 42 after the mounting end 30-1 of the glass panel 30 has been positioned inside the channel 36. In frame 80, prior to the filling the channel 36 with the adhesive 42, the method may also include fixing the glass panel 30 to the clip body 34 via the first fastener 46 at the first aperture 44. In frame 80, the method may additionally include directing the adhesive 42 into the channel 36 via the third aperture 56. Prior to filling the channel 36 with the adhesive 42, in frame 80, the method may also include preloading the mounting end 30-1 of the glass panel 30 inside the channel 36 by the spring element 40B. Furthermore, in frame 80, prior to the filling the channel 36 with the adhesive 42, the method may include pressing on the retainer 40 via the first fastener 46 to compress the spring element 40B inside the channel 36 and thereby position the mounting end 30-1 of the glass panel 30 inside the channel.

After frame 80, the method proceeds to frame 82 where the method includes curing the adhesive 42 within the channel 36. The curing of the adhesive inside the channel 36 may be performed via usage of a catalyst, such as increased temperature or a specific chemical accelerator. Alternatively, the curing of the adhesive inside the channel 36 may be accomplished via permitting a predetermined amount of time to pass without application of any additional catalyst. Following frame 82, method may proceed to frame 84, where the method may include fixing the clip body 34 via the second fastener 50 at the second aperture 48 to the specific window carrier 28-1 or 28-2.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An access door for a vehicle, the access door comprising:
    a door structure;
    a window regulator rail mounted to the door structure;
    a window carrier configured to shift along the window regulator rail; and
    a window assembly configured to be selectively shifted relative to the door structure, wherein the window assembly includes:
        a glass panel having a mounting end;
        a clip assembly fixed to the mounting end of the glass panel, configured to be fixed to the window carrier, and having:
            a clip body defined by a first end configured to engage the window carrier and an opposing second end defining a channel;
            a perforated retainer arranged in the channel and configured to accept and position the mounting end of the glass panel inside the channel; and
            an adhesive configured to penetrate the perforated retainer, fill the channel and cure therein after the mounting end of the glass panel has been positioned inside the channel.

2. The access door of claim 1, wherein the first end of the clip body defines a tapered surface configured to engage the window carrier.

3. The access door of claim 2, wherein the clip body defines a snap-in feature configured to fix the clip assembly to the window carrier after the tapered surface has engaged the window carrier.

4. The access door of claim 2, further comprising a window regulator configured to selectively shift the window assembly along the window regulator rail.

5. The access door system of claim 1, wherein the clip body defines a first aperture arranged to accept a first fastener configured to fix the glass panel to the clip body prior to the adhesive having filled the channel and cured therein.

6. The access door system of claim 5, wherein the clip body defines a second aperture arranged to accept a second fastener configured to fix the clip body to the window carrier.

7. The access door system of claim 6, wherein the first end of the clip body defines a third aperture arranged to receive the adhesive and direct the adhesive into the channel.

8. The access door system of claim 5, wherein the retainer includes a spring element configured to preload the mounting end of the glass panel inside the channel prior to the adhesive having filled the channel and cured therein.

9. The access door system of claim 8, wherein the spring element is a leaf spring.

10. The access door system of claim 8, wherein the first fastener is configured to press on the retainer to compress the spring element inside the channel and position the mounting end of the glass panel inside the channel.

11. A window assembly for a vehicle, the vehicle having:
    a window regulator rail; and
    a window carrier configured to shift along the window regulator rail;
    the window assembly comprising:
        a glass panel having a mounting end;
        a clip assembly fixed to the mounting end of the glass panel, configured to be fixed to the window carrier, and having:
            a clip body defined by a first end configured to engage the window carrier and an opposing second end defining a channel;
            a perforated retainer arranged in the channel and configured to accept and position the mounting end of the glass panel inside the channel; and
            an adhesive configured to penetrate the perforated retainer, fill the channel and cure therein after the mounting end of the glass panel has been positioned inside the channel.

12. The window assembly of claim 11, wherein the first end of the clip body defines a tapered surface configured to engage the window carrier.

13. The window assembly of claim 12, wherein the clip body defines a snap-in feature configured to fix the clip assembly to the window carrier after the tapered surface has engaged the window carrier.

14. The window assembly of claim 12, wherein the vehicle additionally has a window regulator, and wherein the window assembly is operatively connected to the window regulator via the window carrier for being selectively shifted by the window regulator along the window regulator rail.

15. The window assembly of claim 11, wherein the clip body defines a first aperture arranged to accept a first fastener configured to fix the glass panel to the clip body prior to the adhesive having filled the channel and cured therein.

16. The window assembly of claim 15, wherein the clip body defines a second aperture arranged to accept a second fastener configured to fix the clip body to the window carrier.

17. The window assembly of claim 16, wherein the first end of the clip body defines a third aperture arranged to receive the adhesive and direct the adhesive into the channel.

18. The window assembly of claim 15, wherein the retainer includes a spring element configured to preload the mounting end of the glass panel inside the channel prior to the adhesive having filled the channel and cured therein.

19. The window assembly of claim 18, wherein the spring element is a leaf spring.

20. The window assembly of claim 18, wherein the first fastener is configured to press on the retainer to compress the spring element inside the channel and position the mounting end of the glass panel inside the channel.

* * * * *